United States Patent
Isler et al.

[11] Patent Number: 6,022,112
[45] Date of Patent: Feb. 8, 2000

[54] ENDOSCOPIC INSPECTION SENSOR FOR COKE OVEN BATTERIES

[75] Inventors: Daniel Isler, Folschviller; Jean-Paul Gaillet, Peit-Ebersviller; Madjid Bendif; Norbert Bastian, both of Freyming-Merlebach, all of France

[73] Assignee: Centre de Pyrolyse de Marienau "CMP", Forbach, France

[21] Appl. No.: 09/180,931

[22] PCT Filed: May 23, 1997

[86] PCT No.: PCT/FR97/00902

§ 371 Date: Nov. 16, 1998

§ 102(e) Date: Nov. 16, 1998

[87] PCT Pub. No.: WO97/45761

PCT Pub. Date: Dec. 4, 1997

[30] Foreign Application Priority Data

May 30, 1996 [FR] France ................................. 96 06645

[51] Int. Cl.[7] ............................ H04N 5/232; H04N 7/18; F27D 21/02
[52] U.S. Cl. ............................ 359/503; 358/367; 348/83; 348/214
[58] Field of Search ..................................... 359/503, 894, 359/895, 367; 348/82, 83, 84, 85, 214

[56] References Cited

U.S. PATENT DOCUMENTS 3,974,330  8/1976  Askowith et al. ..................... 348/85
4,131,914  12/1978  Bricmont .
5,519,543  5/1996  Olsson et al. .

FOREIGN PATENT DOCUMENTS 0 364 578  4/1990  European Pat. Off. .
2 102 259  4/1972  France .
2 168 811  6/1986  United Kingdom .

*Primary Examiner*—Jon Henry
*Attorney, Agent, or Firm*—Sixbey Friedman Leedom & Ferguson; Thomas W. Cole

[57] ABSTRACT

An endoscopic probe includes an inspection head attached to the end of a longitudinally flexible supporting line which connects it to an operating unit provided with means for moistening the line. The supporting line (2) is rigid under axial torsion, whilst the inspection head (1) is movable in axial rotation and is formed by a demountable assemblage of two parts: a permanent part (11), attached to the end of the supporting line by means of a rotary joint (10) and housing a miniaturized photography device (26), and an interchangeable part (12), fastened rigidly to said permanent part in the extension of the latter with the aid of a demountable joint (44) and comprising a parietal (lateral or axial) orifice provided with a wide angle ocular lens (23) followed by an optical line (25) for conveying the light energy picked up by said lens toward the photography device (26). A motor system and encoder (32 to 36) are mounted in the probe for motorizing the axial rotation of the inspection head and ensuring adjustment of its angular position in relation to the supporting line. The endoscopic probe is suitable for the visual inspection of the flues of coke ovens.

10 Claims, 2 Drawing Sheets

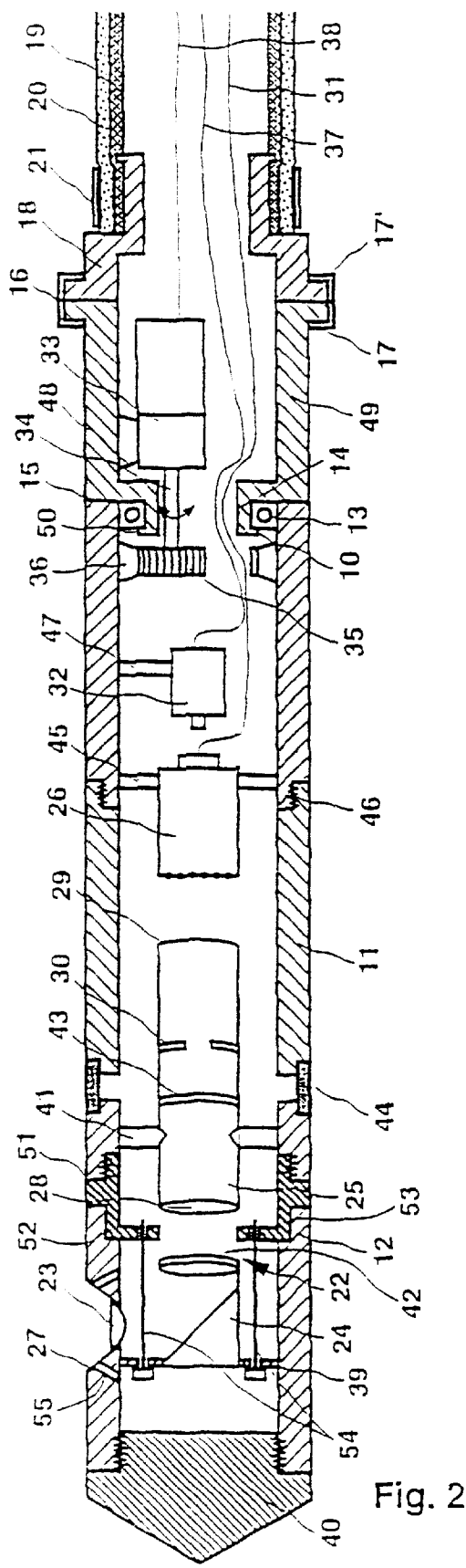
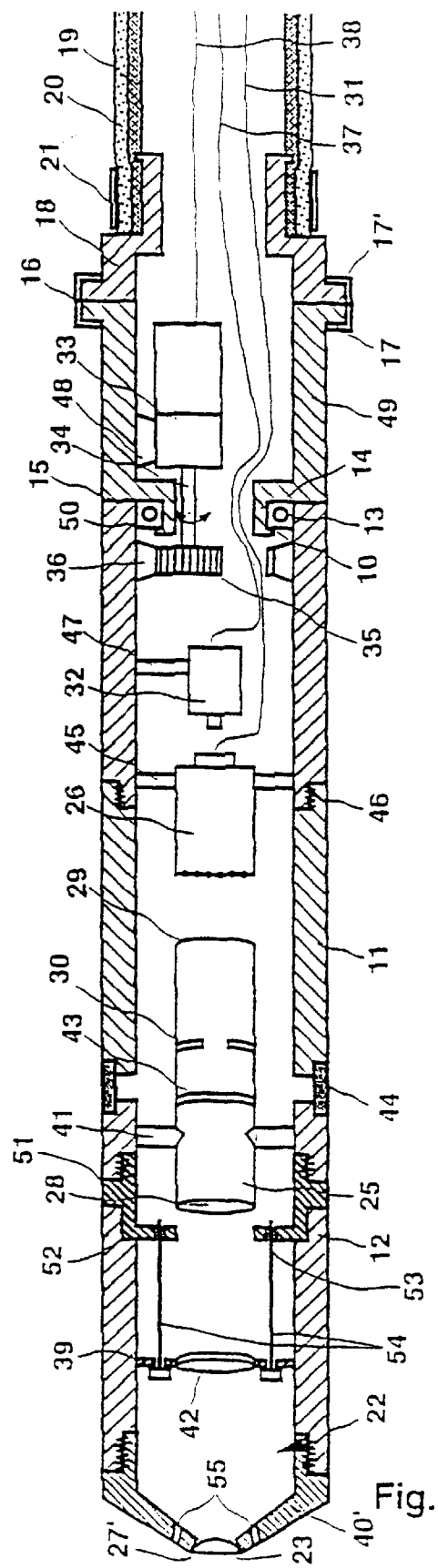
Fig. 2
Fig. 3

ENDOSCOPIC INSPECTION SENSOR FOR COKE OVEN BATTERIES

FIELD OF THE INVENTION

The present invention relates to the maintenance of industrial furnaces, in particular coke oven batteries. It is concerned, more specifically, with an accurate monitoring of the state of the refractories forming the walls of the flues of these ovens, even while the latter are in operation.

During its period of operation, a coke oven battery undergoes thermomechanical stresses essentially caused by the cyclic nature of the operations of loading and unloading the materials. This results, sooner or later, in permanent deformations of the metallic parts and refractories which will reduce the service life of the battery.

In order to achieve satisfactory service lives of thirty years or more, an accurate diagnosis of the state of the oven refractories must be made at regular intervals. However, this diagnosis is often difficult to make on account of the very limited accessibility of some zones of the oven, such as, for example, the flues, which, moreover, are the places which are subjected to the greatest thermal stress. This may result in actions which are too late and repairs which are inappropriate or useless.

Endoscopy is a technique which will henceforth be in widespread use in many sectors of industry, but is still, at present, put to little use in the field of coking, possibly because most of the endoscopes proposed prove unsuitable for inspecting the refractories within the flues of coke ovens, no doubt particularly in view of the extreme thermal conditions which prevail there.

In outline, the probes used or capable of being used at the present time for inspecting coke oven flues may be divided into two types which have in common the fact that the inspection head housing the sensitive element is suspended in the flue at the end of a supporting line which connects it to an operating unit arranged outside the oven.

PRIOR ART

According to a first known type, which actually includes endoscopes, the supporting line consists of a long rigid metallic tube cooled by internal water circulation and operated in vertically translational motion by means of a rack-and-pinion system. This embodiment constitutes a heavy and bulky assembly which is difficult to handle and, in fact, is intended to remain permanently in place, whereas inspection requirements are of short duration and are at relatively long time intervals.

In a second known type of probe, which includes the present invention, the rigid tube is replaced by a longitudinally flexible sleeve wound on a drum, the lower part of which is immersed in a water tank intended for moistening the sleeve in order to cool the latter. This technology results from the discovery that it was possible, in fact, to dispense with cooling by internal water circulation, provided that there was a simple and lightweight appliance which could be operated quickly, and by means of which the rapidity with which the inspection operations were carried out made it possible to dispense with a complicated cooling system. Thus, the probe described in the document FR-B-84.18822 was designed and developed. In this probe, the sensitive head consists of an optical pyrometer of elongate shape (the "pencil" type), which is protected within a sheath made of fibrous refractory material ballasted at the base and the upper part of which is attached to the end of the flexible supporting sleeve, said end housing a steel rope, at the end of which the pyrometer is suspended. This probe seems to have been entirely satisfactory hitherto. However, it is limited to supplying the temperature of the gases within the flues, and this quantity is only a distant indicator of the state of the refractories of the walls.

SUMMARY OF THE INVENTION

The object of the present invention is to achieve a direct visual observation of these walls.

For this purpose, the subject of the invention is an endoscopic probe for inspecting the refractory walls of industrial furnaces, in particular the flues of coke ovens, of the type comprising an inspection head enclosing the sensitive element and attached to the end of a longitudinally flexible supporting line which connects it to an operating unit provided with means for moistening the line, said probe being defined in that the supporting line is rigid under axial torsion, in that the inspection head is movable in axial rotation and is formed by a demountable assemblage of two parts: a permanent part, attached to the end of the supporting line by means of a rotary joint and housing a photography device (advantageously a miniature video camera), and an interchangeable part, fastened to the permanent part in the extension of the latter and comprising a parietal (frontal or lateral) orifice provided with an objective followed by an optical means for conveying the light energy picked up by the objective toward the photography device, and in that means are mounted in the probe in order to ensure motorization of the axial rotation of the inspection head and adjustment of its angular position in relation to the supporting line.

According to one embodiment, the supporting line consists of a tubular metallic reinforcement consisting of braided wires and covered by a flexible casing made of fibrous refractory material.

According to a preferred arrangement, the mounted means for actuating the inspection head in rotation and ensuring that it is in a desired angular position consist of a motor fixed to the supporting line and comprising a transmission shaft having an end pinion in engagement on the inner wall of said supporting line.

In the case of an interchangeable part with a lateral parietal orifice, the optical conveying means comprises a prism for returning the light energy picked up by the lens toward the camera, said prism being located in the vicinity of said lens.

As will have been understood, the invention lies essentially in the combination between a supporting line flexible in the "longitudinal" direction, so as to be capable of being wound, but otherwise rigid, in order to prevent it from experiencing any unexpected torsional movement about its axis, with, at its free end, means for the visual observation of the flue walls illuminated naturally in the red range by the thermal radiation from the operating oven, said means being mounted movably in axial rotation with the aid of a mounted actuator controlled remotely by an operator from his control station, where said observation means give him an actual and instantaneous image of the walls of the flues.

BRIEF DESCRIPTION OF THE DRAWINGS

The invention will be well understood and other aspects and advantages emerge clearly from the following description given by way of exemplary embodiment, with reference to the accompanying drawing plates in which:

FIG. 2 shows, in axial longitudinal section, the detail of a sensitive head mounted at the end of a line of the endoscope according to the invention;

FIG. 3 is an illustration similar to that of FIG. 2, but relating to an alternative embodiment with regard to the observation direction.

The same elements are designated by identical references in the figures.

DESCRIPTION OF THE PREFERRED EMBODIMENTS

Figure 1:
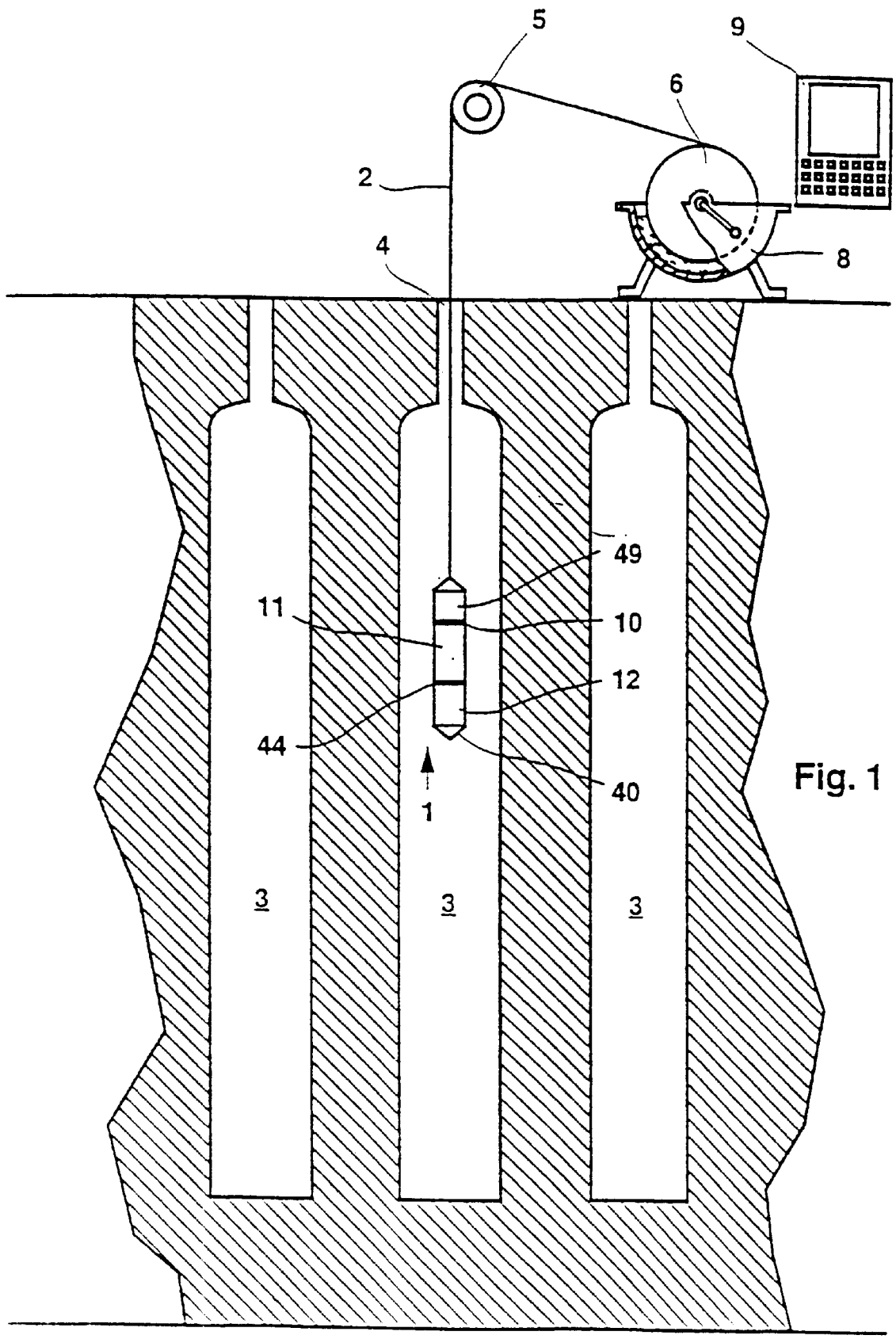
FIG. 1 show, in vertical section, a portion of flues of a coke oven battery, an endoscope according to the invention working on the floor of said flues.

Referring first of all to FIG. 1, it will be seen that the inspection head 1 is suspended by means of its flexible supporting line 2 and penetrates by gravity into the flue 3 via an upper orifice 4 of the latter. The flexible supporting line 2 passes around a return pulley 5 and is wound onto a drum 6 provided with means for setting in rotation which are illustrated by the crank handle 7. A semicylinderical tank 8 filled with water immerses the lower part of the winding drum 6 so as to wet the supporting line 2. A screen console 9 is mounted at chest height on the frame of the drum and enables the operator to carry out all the operations by permanent visual control afforded by the display screen which displays what the inspection head 1 sees. The latter consists externally of a metallic capsule of elongate shape (a length of about 50 cm with a diameter of a few centimeters), accommodated in a rigid shell (not illustrated) of refractory material for thermal protection and for protection against shocks. The inspection head is composed of two consecutive portions of approximately the same length, fastened to one another by means of an assembly flange formed by a knurled ring 44 screwable by hand: an "upstream" portion 11 attached to the supporting line 2 by means of a rotary joint 10 and an interchangeable "downstream" part 12. This rotary joint 10 may be produced conventionally with the aid of a ball bearing 13, the inner ring of which is mounted about an entrant annular bearing surface 14 of the connector 49 forming the termination of the supporting line 2 and the outer ring of which is in engagement with the inner wall of the rotationally movable "downstream" part. These arrangements may, of course, be reversed. Care will, however, be taken always to dimension the rotary joint 10 so as to provide only simple functional play 15 between the rotary "downstream" part and the fixed "upstream" part, in order to ensure sealing relative to the outside as well as possible. A collar 50 formed at the end of the bearing surface 14 ensures that the head 1 is blocked in terms of translational motion in relation to the supporting line.

As can be seen, the connector 49 is fastened to the rest of the supporting line 2 by means of a clamping strap 16 in two parts which are screwed to one another and the free ends of which form pushers which lay one against the other the collars 17 and 17' provided, for this purpose, respectively at the end of the connector 49 and at the end of the flange 18, onto which the flexible sleeve 19 forming the supporting line 2 comes into engagement.

According to an essential characteristic of the invention, this sleeve must be sufficiently flexible to be wound onto a drum, for example of a diameter of about 50 cm, and be capable of resuming a rectilinear shape simply under the effect of weight of the inspection head 1 during unwinding. At the same time, this sleeve must be sufficiently rigid under axial torsion to avoid superimposing random rotational movements on that of the "downstream" part of the inspection head controlled by the operator. For this purpose, the flexible sleeve 19 advantageously consists of a reinforcement made from braided flat stainless steel wire, similar to the metallic sleeves used for protecting and armoring electric cables.

The sleeve is wrapped in a layer 20 of a fibrous flexible insulator, such as rock wool in strip form, capable of being moistened by being immersed in the water of the tank and of thus thermally protecting the sleeve and the various cables and wires which it contains. Assemblage is ensured by means of a clamping strap. In a sleeve of this type, a flexible rod may perfectly well be fitted over the entire length, in order to allow cooling air to circulate, if desired.

Referring more specifically to FIG. 2, it will be seen that the interior of the lateral-sighting inspection head 1 is provided with a certain number of members which are as follows, commencing from the bottom:

First of all, an optical line 22 for the visual acquisition of the images seen by the probe and comprising: a "wide angle" lens 23 coupled to a return prism 24 associated with an adaption doublet 42 which forms the first element of the optical chain serving for transferring the image formed by the lens 23 in the direction of the photography device. The rest consists of an optical tube 25 mounted in front of the photography device 26. The lens 23 occupies an orifice 27 made for this purpose in the lateral wall of the inspection head 1. The visual field of said objective determines the extent of the observable area on the wall of the flues. The prism 24 returns at right angles the light being received from the lens 23, so as to orient it along the longitudinal axis of the probe in the direction of the optical tube 25. The latter, provided with an entry doublet 28 and an exit doublet 29 at its ends, with a spectral attenuating or correcting filter 43 and with a brightness adaption diaphragm 30, is intended for transporting the image toward the photography device 26 which advantageously consists of a microcamera having a photodiode matrix. The image of the inspected area, received in this way by the camera, is transmitted to the display screen 9 with the aid of the flexible cable 31.

The inspection head 1 comprises, furthermore, an incremental encoder 32 making it possible, at any moment, to know the angular position of the lens 23 (and therefore of the observation direction) in relation to a "zero" reference point and thus to be able to perform a complete circular scan of the flue under the operator's permanent control or to find a previously observed area easily again.

The inspection head 1 is also provided with a reversible synchronous direct current motor 33 associated with its transmission members, namely a drive shaft 34, at the end of which a pinion 35 meshes on a gear wheel 36 fastened against the inner wall of the rotationally movable "downstream" part of the probe.

Of all the items of equipment specified above, only the motor 33, together with its pinion shaft 34, 35, is not fixed to the rotary head 1. It is fastened in the connector by means of a fastening 48.

Electric cables 37 and 38 make the necessary connections of the encoder 32 and motor 33 to the outside.

All these items of equipment are fastened in the probe with the aid of retainers which connect them rigidly to the inner wall. The retainers 39 for fastening the prism 24 and its associated adaption doublet 42 are accessible from the front of the probe after the probe nose 40 has been removed.

Improved accessibility of this essential part of the probe may advantageously be achieved with the aid of the flange 51 screwed to the end of the tube 11 and having, on the one hand, a cylindrical bearing surface 52, onto which the tube forming the interchangeable part 12 is slipped, at the same time being selfcentered, and, on the other hand, a radial ring 53 provided with internal threads, into which clamping screws 54 engage. The latter, likewise accessible after the nose 40 has been removed, bear, at their end, on the retainer 39 which they pass through, thus ensuring that the interchangeable part 12 is fastened to the tube 11 by clamping.

The retainer 41 for fastening the optical tube 25 is accessible from the removable ring 44, also allowing access to the filter 43. The retainer 45 for fastening the photography device 26 is accessible by means of a screw connection 46 which joins the two contiguous sections forming the permanent part 11. Said retainer also makes it possible, after the camera 26 has been removed, to gain access to the retainer 47 anchoring the incremental encoder 32.

It will be seen that small ducts 55 are made in the tube 12 in the region of the orifice 27 and distributed around the lens 23. These ducts, which connect the interior of the probe to the space provided in front of the lens 23, make it possible to set up a protective air curtain in front of the frontal lens of this objective if, according to a preferred embodiment of the invention, a stream of cooling air passes through the interior of the probe.

With the exception of the prism 24, which in this case has become useless, all these elements and particular arrangements are found again identically in the inspection head of FIG. 2, designed for axial sighting. In this variant, the lateral orifice 27 has been replaced by an axial orifice 27' made in the endpiece 40' forming the probe nose. This orifice receives the wide angle lens 23 which then transmits the image picked up to the optical tube 25.

All the rest is unchanged. It will be understood that it is thus easily possible, with the same basic equipment, to change from a lateral-sighting configuration (FIG. 1) to an axial-sighting configuration (FIG. 2), and vice versa, simply by replacing the interchangeable "downstream" part 12 which can easily be removed by hand by means of the screwing ring 44. Likewise, for a given configuration, it is possible to change from panoramic vision to a more detailed zone of the surface to be inspected, by means of a set of interchangeable parts fitted with lens 23 having a progressive optical angle ranging from 30 to 105° C.

The invention is, of course, not limited to the examples described, but extends to many variants or equivalents, in as much as the essential characteristics of the endoscope, as is defined in the accompanying claims, are reproduced.

We claim:

1. An endoscopic probe for inspecting the refractory walls of industrial furnaces, comprising:
   an inspection head enclosing a light sensitive element and attached to the end of a longitudinally flexible supporting line which connects said head to an operating unit provided with a device for moistening the line, wherein the supporting line is resistive to axial torsion, and the inspection head is formed by a permanent part housing said light sensitive element, and an interchangeable part detachably connectable to said permanent part and including a parietal orifice for directing light from said refractory walls to said light sensitive element.

2. The endoscopic probe as claimed in claim 1, wherein the supporting line includes a tubular metallic reinforcement having braided wires and covered by a flexible casing made of refractory material.

3. The endoscopic probe as claimed in claim 1, wherein the light sensitive element is a camera having a photodiode matrix.

4. The endoscopic probe as claimed in claim 1, wherein the inspection head includes a rotatable joint for allowing said interchangeable part to rotate relative to said permanent part, and a rotation device for rotating said interchangeable part relative to said permanent part.

5. The endoscopic probe as claimed in claim 4, further comprising an incremental encoder mounted in the permanent part of said inspection head for indicating an annular position of said interchangeable part relative to said permanent part.

6. The endoscopic probe as claimed in claim 1, wherein the interchangeable part includes a lateral parietal orifice provided with an lens associated with a prism for directing light from said orifice to said light sensitive element.

7. The endoscopic probe as claimed in claim 1, wherein the interchangeable part includes an axial parietal orifice provided with a lens for directing light from said orifice to said light sensitive element.

8. The endoscopic probe as claimed in claim 1, wherein that end of the supporting line attached to the inspection head is attached to a connector having, at one end, a bearing surface for a rotary joint and, at its other end, a joint for rigid connection, demountable together with the rest of the supporting line.

9. The endoscopic probe as claimed in claim 1, further comprising a demountable joint connecting the permanent part to the interchangeable part.

10. The endoscopic probe as claimed in claim 1, further comprising a mechanism for an internal circulation of cooling air through said flexible supporting line.

* * * * *